US011416637B2

(12) United States Patent
Courtiade et al.

(10) Patent No.: US 11,416,637 B2
(45) Date of Patent: Aug. 16, 2022

(54) METHOD OF MANAGING PRIVILEGES IN A TAMPER-PROOF DEVICE COMPRISING SEVERAL SOFTWARE CONTAINERS

(71) Applicant: THALES DIS FRANCE SAS, Meudon (FR)

(72) Inventors: Fabien Courtiade, Gemenos (FR); Florent Labourie, Gemenos (FR); Denis Dubois, Gemenos (FR); Syarif Ahmad, Gemenos (FR); Jianrong Yang, Gemenos (FR); Nopiga Pahala, Gemenos (FR); Shier Loon Sharon Yong, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 43 days.

(21) Appl. No.: 16/765,222

(22) PCT Filed: Nov. 6, 2018

(86) PCT No.: PCT/EP2018/080318
§ 371 (c)(1),
(2) Date: May 19, 2020

(87) PCT Pub. No.: WO2019/101507
PCT Pub. Date: May 31, 2019

(65) Prior Publication Data
US 2020/0279057 A1    Sep. 3, 2020

(30) Foreign Application Priority Data

Nov. 21, 2017 (EP) ..................................... 17306605
Feb. 21, 2018 (EP) ..................................... 18305181

(51) Int. Cl.
*G06F 7/04* (2006.01)
*G06F 15/16* (2006.01)
(Continued)

(52) U.S. Cl.
CPC .............. *G06F 21/71* (2013.01); *G06F 21/77* (2013.01); *H04L 63/0263* (2013.01);
(Continued)

(58) Field of Classification Search
CPC ..... G06F 21/71; G06F 21/77; H04L 63/0263; H04L 63/166; H04L 63/16; H04W 4/60;
(Continued)

(56) References Cited

U.S. PATENT DOCUMENTS

2008/0163352 A1* 7/2008 Boudou .................. H04L 67/02
726/9
2013/0060959 A1* 3/2013 Taveau ............... G06Q 20/3278
709/232
(Continued)

FOREIGN PATENT DOCUMENTS

WO       2008123827 A1    10/2008

OTHER PUBLICATIONS

"Global Platform Card Specification," Version 2.2.1, http://www.globalplatform.org, 303 pages, (Jan. 1, 2011).
(Continued)

*Primary Examiner* — Amie C. Lin
(74) *Attorney, Agent, or Firm* — Marc Boillot; THALES DIS CPL USA, Inc

(57) ABSTRACT

The invention is a method for managing a tamper-proof device comprising a processor and an operating system able to handle a set of communication protocols with external entities. The operating system accesses a ruling data specifying for each communication protocol of the set whether Card Lock, Card Terminate and Final Application privileges as defined by GlobalPlatform Card Specification (V2.3) are authorized or forbidden. Upon receipt of a command from one of said external entities, the operating system uses the ruling data to deny or to authorize execution of the command
(Continued)

based on the communication protocol used to convey the command.

15 Claims, 4 Drawing Sheets

(51) Int. Cl.
| | | |
|---|---|---|
| G06F 17/30 | (2006.01) | |
| H04L 29/06 | (2006.01) | |
| G06F 21/71 | (2013.01) | |
| H04W 4/60 | (2018.01) | |
| H04L 9/40 | (2022.01) | |
| G06F 21/77 | (2013.01) | |
| H04W 12/30 | (2021.01) | |
| H04W 12/50 | (2021.01) | |
| H04W 12/086 | (2021.01) | |

(52) U.S. Cl.
CPC ............ *H04L 63/166* (2013.01); *H04W 4/60* (2018.02); *H04W 12/086* (2021.01); *H04W 12/35* (2021.01); *H04W 12/50* (2021.01)

(58) Field of Classification Search
CPC ... H04W 12/086; H04W 12/35; H04W 12/50; H04W 12/45; H04W 12/04; H04W 12/08
See application file for complete search history.

(56) References Cited

U.S. PATENT DOCUMENTS

| | | | | |
|---|---|---|---|---|
| 2013/0111546 | A1* | 5/2013 | Gargiulo | ............... H04W 12/04 |
| | | | | 726/1 |
| 2015/0178723 | A1* | 6/2015 | Khan | .................. H04W 12/086 |
| | | | | 726/6 |
| 2016/0006762 | A1 | 1/2016 | Dumoulin et al. | |
| 2017/0142159 | A1 | 5/2017 | Li et al. | |
| 2017/0295158 | A1 | 10/2017 | Chastain | |
| 2018/0084426 | A1* | 3/2018 | Yang | ..................... H04W 12/06 |

OTHER PUBLICATIONS

International Search Report and Written Opinion issued in corresponding International Patent Application No. PCT/EP2018/080318, 11 pages (dated Dec. 13, 2018).
International Search Report and Written Opinion issued in International Patent Application No. PCT/EP2018/080329, 11 pages (dated Dec. 13, 2018).
"ISO/IEC 7816-3 Identification cards—Integrated circuit cards—Part 3: Cards with contacts—Electrical interface and transmission protocols," http://read.pudn.com/downloads132/doc/comm/563504/ISO-IEC%207816/ISO+IEC%207816-3-2006.pdf, 58 pages (Nov. 1, 2006).

* cited by examiner

METHOD OF MANAGING PRIVILEGES IN A
TAMPER-PROOF DEVICE COMPRISING
SEVERAL SOFTWARE CONTAINERS

FIELD OF THE INVENTION

The present invention relates to methods of managing privileges in a tamper-proof device comprising several software containers. It relates particularly to methods of managing requests to use privileges by external entities.

BACKGROUND OF THE INVENTION

A tamper-proof device, also called secure element, is a physical component able to store data and to provide services in a secure manner. In general, a tamper-proof device has a limited amount of memory, a processor with limited capabilities and is devoid of battery. For instance a UICC (Universal Integrated Circuit Card) is a tamper-proof device embedding SIM applications for telecommunication purposes. A tamper-proof device can be installed, fixedly or not, in a terminal, like a mobile phone for example. In some cases, the terminals are constituted by machines that communicate with other machines for M2M (Machine to Machine) applications.

A tamper-proof device can be in the format of a smart card, or may be in any other format such as for example but not limited to a packaged chip as described in PCT/SE2008/050380, or any other format.

It is known to solder or weld the tamper-proof device in a host device, in order to get it dependent of this host device. This is done in M2M (Machine to Machine) applications. The same objective is reached when a chip (a tamper-proof device) containing a Payment application, SIM or USIM applications and associated files is contained in the host device. The chip is for example soldered to the mother-board of the host device or machine and constitutes an embedded UICC (eUICC).

A tamper-proof device like an embedded UICC (eUICC) can contain several telecom profiles (subscriptions) attached to one or several telecom operators. Such tamper-proof devices must comply with GSMA SGP 0.22 RSP Technical Specification and GSMA Remote Provisioning Architecture for embedded UICC Technical Specification (SGP.02) due to interoperability reasons.

It is also know to use tamper-proof devices complying with GlobalPlatform Card Specification standard. Such tamper-proof devices including embedded secure element (or eSE)—can contain non-telecom applications like payment GlobalPlatform Card Specification applications or access applications.

So far these two kinds of tamper-proof device are implemented through separate physical components. Nowadays, a new need is emerging: embedding both features of a eUICC and of an eSE in a single tamper-proof device.

According to Remote Provisioning Architecture for Embedded UICC Technical Specification (SGP.02), Card Lock, Card Terminate and Final Application privileges (as defined by GlobalPlatform Card Specification) are not applicable for eUICC product and shall not be assigned to any Security Domain/Application.

According to GlobalPlatform Card Specification, an eSE product must support these three privileges.

Thus there is a contradiction between these two standards. There is a need to solve this discrepancy for single tamper-proof device which embeds both features of a eUICC and of an eSE.

SUMMARY OF THE INVENTION

The invention aims at solving the above mentioned technical problem.

The object of the present invention is a method for managing a tamper-proof device comprising a processor and an operating system which is able to handle a set of communication protocols with external entities. The operating system accesses a ruling data specifying for each communication protocol of said set whether Card Lock, Card Terminate and Final Application privileges as defined by GlobalPlatform Card Specification are authorized or forbidden. Upon receipt of a command from one of said external entities, the operating system uses the ruling data to deny or to authorize execution of the received command based on the communication protocol used to convey the command.

Advantageously, the tamper-proof device may comprise both a first software container including a security domain compliant with GlobalPlatform Card Specification (V2.3) and a second software container including a Telecom profile compliant with GSMA Remote Provisioning Architecture for embedded UICC Technical Specification (SGP.02).

Advantageously, the tamper-proof device may comprise a registry storing a state set to SECURED, the command may be a SET STATUS requesting a change toward CARD_LOCKED state, said SECURED and CARD_LOCKED states and SET STATUS being compliant with GlobalPlatform Card Specification. The operating system may deny execution of the command if the communication protocol used to convey the command is compliant with the transport layer protocol as defined by ETSI ISO7816-3 and the operating system may authorize execution of the command if the communication protocol used to convey the command is compliant with SPI or SWP.

Advantageously, the operating system may have received, from a source internal to the tamper-proof device, a request to change toward CARD_LOCKED state and the operating system may deny execution of the request if the source belongs to a software container including a Telecom profile compliant with GSMA Remote Provisioning Architecture for embedded UICC Technical Specification (SGP.02).

Advantageously, the set of communication protocols may comprise T=0 or T=1 as defined by ETSI ISO7816-3 and at least one of the following group: SWP contactless type A, SWP contactless type B, SWP contactless type F, APDU Gate or SPI.

Advantageously, the tamper-proof device may be an embedded secure element, an integrated secure element, a secure enclave, a smart card or a Machine-To-Machine device.

Another object of the invention is a tamper-proof device comprising a processor and an operating system able to handle a set of communication protocols with external entities. The operating system comprises a ruling data specifying for each communication protocol of said set whether Card Lock, Card Terminate and Final Application privileges as defined by GlobalPlatform Card Specification are authorized or forbidden. The operating system comprises a supervisor agent configured to, upon receipt of a command from one of said external entities, use the ruling data to deny or authorize execution of the command based on the communication protocol used to convey the command.

Advantageously, the tamper-proof device may comprise both a first software container including a security domain compliant with GlobalPlatform Card Specification and a second software container including a Telecom profile compliant with GSMA Remote Provisioning Architecture for embedded UICC Technical Specification.

Advantageously, the tamper-proof device may comprise a registry storing a state set to SECURED, the command may be a SET STATUS requesting a change toward CARD_LOCKED state, said SECURED and CARD_LOCKED states and SET STATUS being compliant with GlobalPlatform Card Specification. The operating system may be configured to deny execution of the command if the communication protocol used to convey the command is compliant with the transport layer protocol as defined by ETSI ISO7816-3 and the operating system may be configured to authorize execution of the command if the communication protocol used to convey the command is compliant with SPI or SWP.

Another object of the invention is a host device embedding a tamper-proof device according to the invention.

Advantageously, the host device may be a phone, a watch, a pair of glasses, a car, a meter, a drone or a robot.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of tamper-proof devices or secure elements intended to contain several software containers and able to communicate through at least two protocols. The tamper-proof device may be coupled to any type of host machine. For example the host machine may be a mobile phone, a vehicle, a meter, a slot machine, a TV, a tablet, a laptop, a connected watch, a pair of connected glasses, a meter, a robot, a drone or a computer.

The tamper-proof device may be an embedded secure element (eSE), an integrated secure element (iSE), a secure enclave, a smart card or a Machine-To-Machine device. An integrated secure element is a secure element integrated in a hardware element providing additional functionalities distinct from the features of the secure element. For instance a baseband modem may comprise an iSE. More information related to eSE and iSE may be found in Javacard Platform Classic Edition v3.0.5 and Global Platform Card Specifications v2.3.

The external entities which are intended to send commands (messages) to the software containers may be remote servers, a NFC device, hardware or software components of the hosting machine itself or any computer machine adapted to initiate the sending of a message targeting one of the software container.

Figure 1:
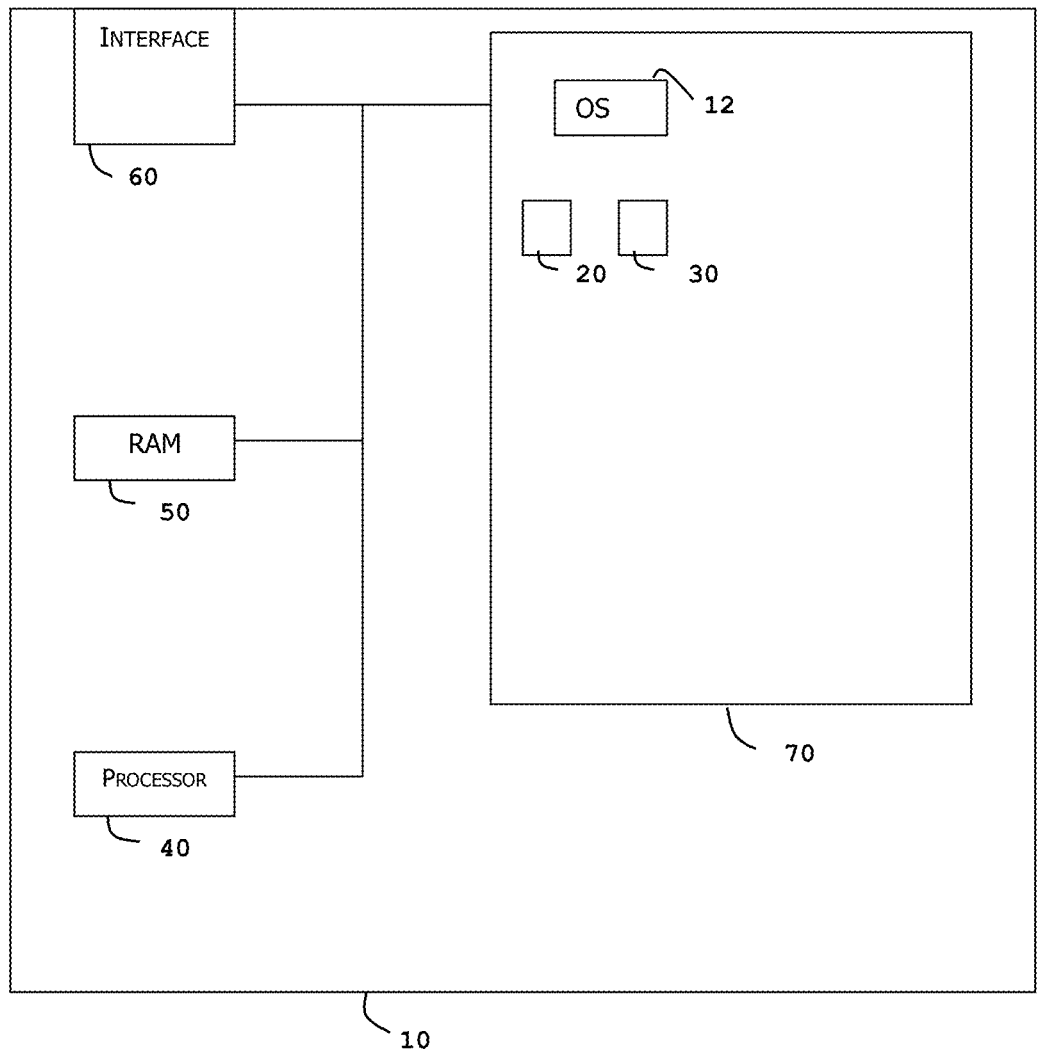
FIG. 1 is an example of hardware architecture of a tamper-proof device according to the invention.

FIG. 1 shows an example of hardware architecture of a tamper-proof device according to the invention.

In this example, the tamper-proof device 10 is a secure element welded to a phone (not shown). For instance the tamper-proof device 10 may be a chip embedded in a smartphone. The tamper-proof device 10 comprises a processor 40, a working memory 50, a nonvolatile memory 70 and a communication interface 60.

The working memory 50 may be a RAM and the nonvolatile memory 70 may be a flash memory. The communication interface 60 is designed to convey data according to several communication protocols. For instance, the communication interface 60 may be designed to comply with both ISO7816-3 T=0 protocol, SWP (Single Wire Protocol) and the Serial Peripheral Interface (SPI).

The nonvolatile memory 70 comprises the operating system 12 of the tamper-proof device and two software containers 20 and 30. These software containers are separate and managed by the operating system 12 as isolated entities. In other words, the operating system 12 is able to guarantee that one software container cannot unduly access to data belonging to another software container.

In this example, the operating system 12 is configured to handle both ISO7816-3 T=0, SPI and SWP protocols.

In another example, both the communication interface 60 and the operating system 12 can be configured to handle any combination of at least two protocols among the following: T=1 (or T=0) as defined by ETSI ISO7816-3, SWP contactless type A by ETSI TS 102 613 V.11.0.0—UICC-CLF Interface, SWP contactless type B as defined by ETSI TS 102 613 V.11.0.0—UICC-CLF Interface, SWP contactless type F, SPI and APDU Gate as defined by HCI Extension for the Embedded Secure Element Certification 0.5 and ETSI 102.622 v12.1.0 standard.

The operating system 12 and the communication interface 60 may also be configured to handle a proprietary communication protocol.

Figure 2:
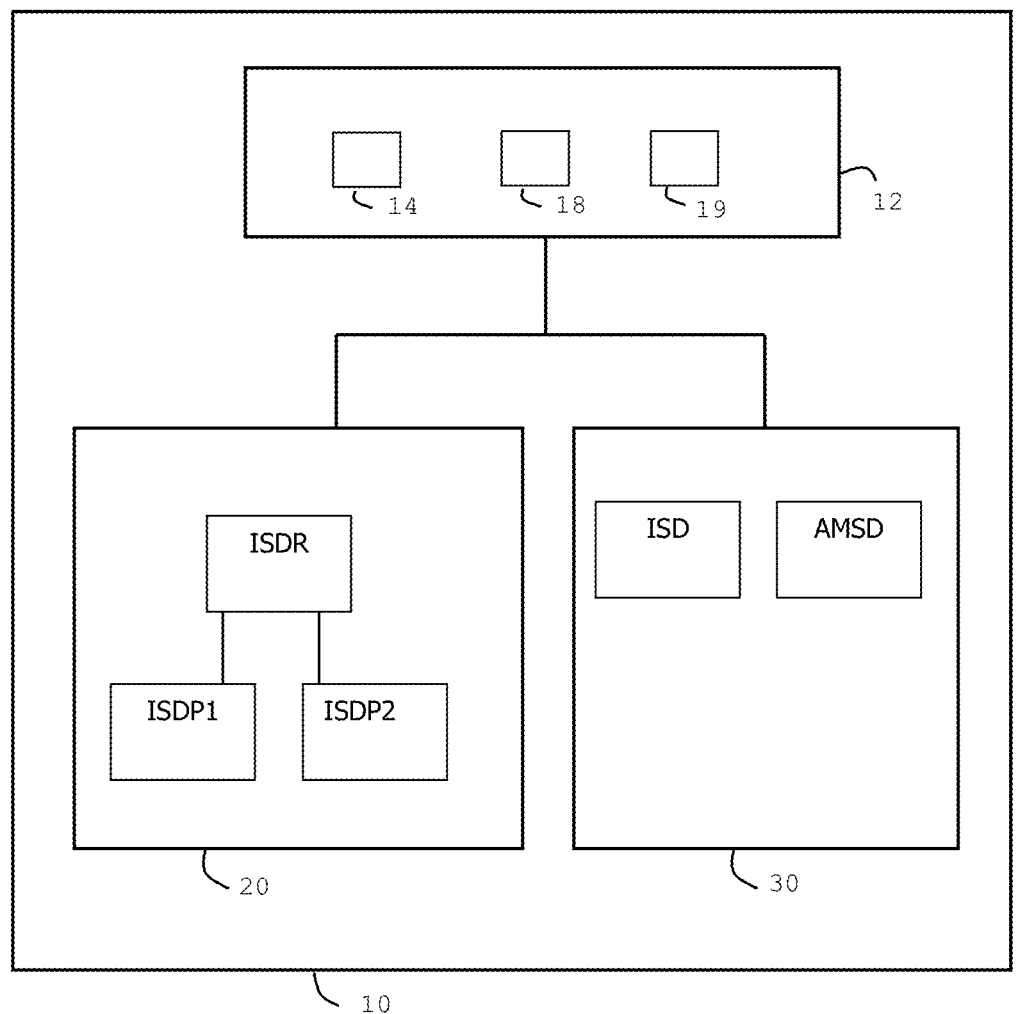
FIG. 2 depicts an example of logical architecture of a tamper-proof device according to the invention.

FIG. 2 shows an example of logical architecture of a tamper-proof device according to the invention.

This figure provides a logical view of the tamper-proof device 10 described at FIG. 1.

The tamper-proof device 10 comprises a software container 30 which stores a profile related to the issuer of the phone hosting the tamper-proof device 10. The structure of this profile is compliant with GlobalPlatform Card Specification V2.3 standard.

More precisely, the software container 30 comprises a main issuer directory named ISD (for Issuer Security Domain). The ISD contains a set of files storing data related to the profile of the host device hosting the tamper-proof device 10.

The software container 30 may contain several applications providing payment, loyalty, building access or NFC services for example. For instance, the software container 30 of FIG. 2 contains a security domain (AMSD) which includes files and data corresponding to a wallet service.

It is to be noted that the software container 30 does not necessarily contain a profile which is related to the issuer of the host device. It may contain any profile (i.e. set of files) which is related to a non-Telecom actor.

The tamper-proof device 10 comprises a software container 20 which stores data related to Telecom operator subscriptions compliant with GSMA SGP 0.22 RSP Technical Specification V2.1 standard and GSMA Remote Provisioning Architecture for embedded UICC Technical Specification (SGP.02) V3.2.

More precisely, the software container 20 comprises a root directory named ISDR (for Root Issuer Security Domain) and two dependent directories containing distinct profiles: ISDP1 and ISDP2. ISDP1 (for Issuer Security Domain of Profile #1) contains a set of files storing data related to a first Mobile Network Operator (MNO) subscription profile. Similarly, ISDP2 (for Issuer Security Domain of Profile #2) contains a set of files storing data related to a second (MNO) subscription profile.

It is to be noted that ISDP1 and ISDP2 may be related to the same MNO.

The operating system 12 comprises a ruling data 14, a registry 19 and a supervisor agent 18. The registry stores the current GlobalPlatform state (i.e. Life cycle state) of the tamper-proof device 10. For instance, the state can be set to SECURED. The ruling data 14 specifies for each communication protocol managed by the operating system 12 whether Card Lock, Card Terminate and Final Application privileges as defined by GlobalPlatform Card Specification (V2.3 or upper) are authorized or forbidden. Preferably, either these three privileges are all allowed or all forbidden for a protocol.

Assuming that the operating system 12 is designed to handle communications through ISO7816-3, SWP and SPI protocols, Card Lock, Card Terminate and Final Application privileges may be forbidden for ISO7816-3 protocol while they are authorized for SWP and SPI protocols.

The supervisor agent 18 is designed to identify the used protocol when an incoming command (or message) is received and to use the identified protocol as a discriminator to deny or authorize execution of the incoming command. Thus, upon receipt of a command from an external entity, the supervisor agent 18 uses the ruling data 14 to reject or authorize execution of the received command based on the communication protocol used to convey the command. Preferably, the rejection or authorization of the command is based on the transport layer of the communication protocol used to convey the command to the tamper-proof device 10.

In the embodiment of FIG. 2, the supervisor agent 18 is a software component embedded in the operating system 12. Both the supervisor agent 18 and the operating system 12 comprise instructions which are executed by the processor of the tamper-proof device 10.

It is to be noted that in the above-described embodiment, versions of the standard are provided as example only. For instance, the tamper-proof device 10 may comprise a software container 20 which stores data related to Telecom operator subscriptions compliant with GSMA SGP 0.22 RSP Technical Specification V2.0 or V2.2.

In one example, the external entity which sends a message (command) to one of the software containers may be an application located in the Rich OS part of a mobile phone. In this case, the message may be conveyed through APDU Gate protocol.

In another example, the external entity which sends a message (command) to one of the software containers may be an application located in the Trusted Execution Environment (TEE) part of a mobile phone. In this case, the message may be conveyed through SPI protocol.

In another example, the external entity which sends a message (command) to one of the software containers may be an application located in an external NFC (Near Field Communication) reader. In this case, the message may be conveyed through SWP protocol via a NFC controller (CLF).

Figure 3:
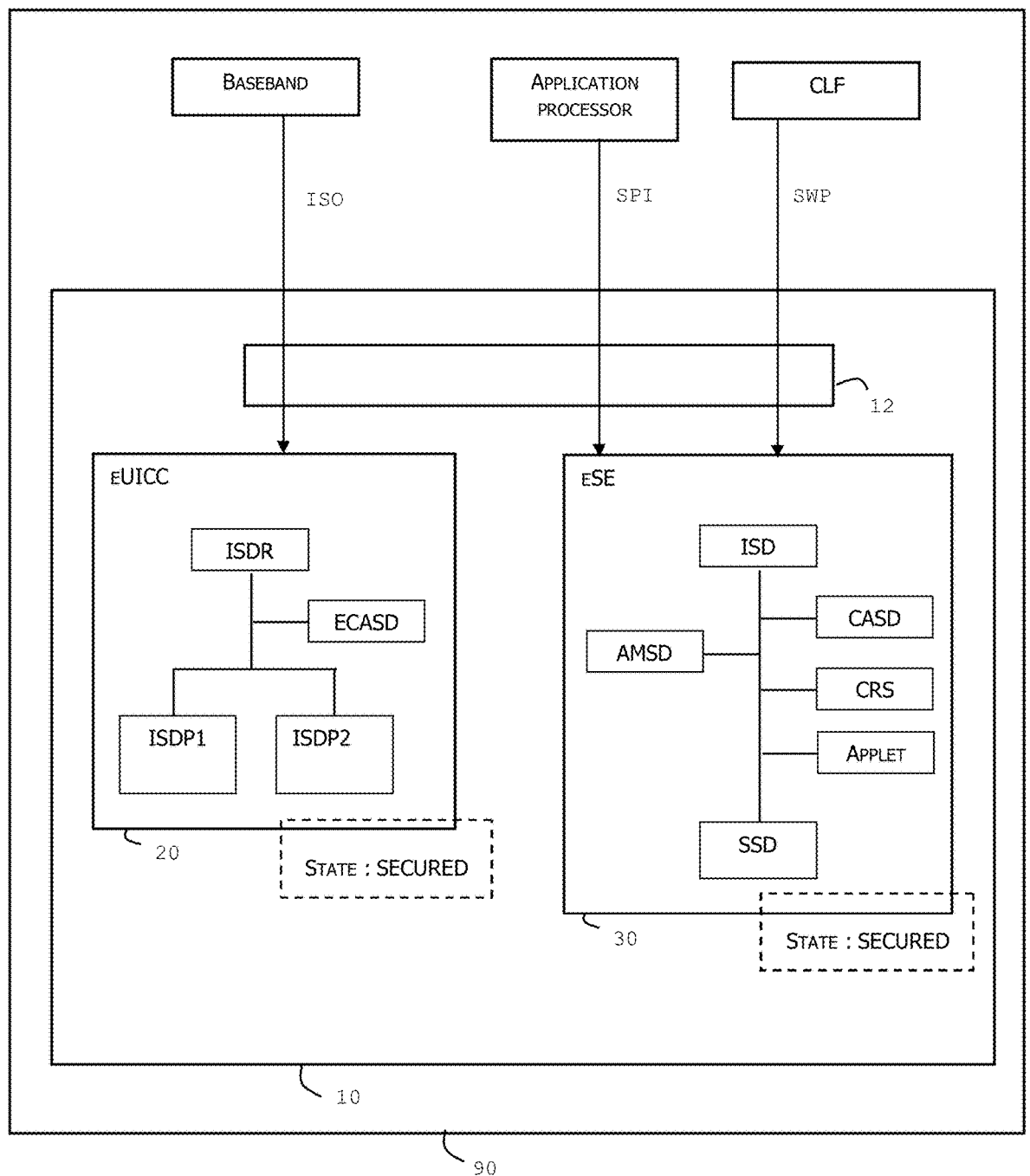
FIG. 3 depicts an example of host comprising a tamper-proof device having an eSE part set to SECURED state according to the invention.

FIG. 3 shows an example of host machine 90 comprising a tamper-proof device 10 having an eSE part set to SECURED state according to the invention.

The tamper-proof device 10 is similar to the one described at FIGS. 1 and 2.

In this example, the state SECURED is stored in the registry 19. The state is also known as Life Cycle State. The operating system 12 is designed to handle communications through ISO7816-3, SWP and SPI protocols. The ruling data 14 specifies that Card Lock, Card Terminate and Final Application privileges are forbidden for ISO7816-3 protocol and authorized for SWP and SPI protocols. The ISD of the software container 30 (corresponding to the eSE part) has the following GlobalPlatform privileges: Final Application and Card Lock.

The ISDR of the software container 20 (corresponding to the eUICC part) is devoid of Final Application and Card Lock GlobalPlatform privileges.

Both ISD and ISDR are managed by the operating system 12 according to SECURED state.

If a command aiming at installing a new application or creating a Security domain with Final Application privilege is received through ISO7816 protocol, the supervisor agent 18 rejects this command since the ruling data 14 specifies that Final Application privilege is forbidden for ISO7816-3 protocol.

If a SET STATUS command requesting a change to CARD_LOCKED state is received through ISO7816 protocol (from the baseband for instance), the supervisor agent 18 denies execution of the received SET STATUS command since the ruling data 14 specifies that Card Lock privilege is forbidden for ISO7816-3 protocol.

If the operating system 12 receives from a source internal to the tamper-proof device 10 a request to change toward CARD_LOCKED state, then the supervisor agent 18 denies execution of the request if the internal source belongs to the software container 20 which includes a Telecom profile compliant with GSMA Remote Provisioning Architecture for embedded UICC Technical Specification (SGP.02). Similarly, if the operating system 12 receives from a source internal to the tamper-proof device 10 a request to allocate Final Application, Card Lock or Card Terminate privilege to a target belonging to the software container 20, then the supervisor agent 18 denies execution of this request. The internal source may be the OPEN (GlobalPlatform Environment), the Issuer Security Domain or an application for instance.

In another example, if a SET STATUS command requesting a change to CARD_LOCKED state is received through SPI protocol (from the Application Processor of the phone 90 for instance), the supervisor agent 18 authorizes execution of the received SET STATUS command according to the ruling data 14. It is to be noted that additional checks are performed by the operating system 12 before executing the SET STATUS command as specified in GlobalPlatform Card Specification. These additional checks may cause the SET STATUS command not to be executed.

Figure 4:
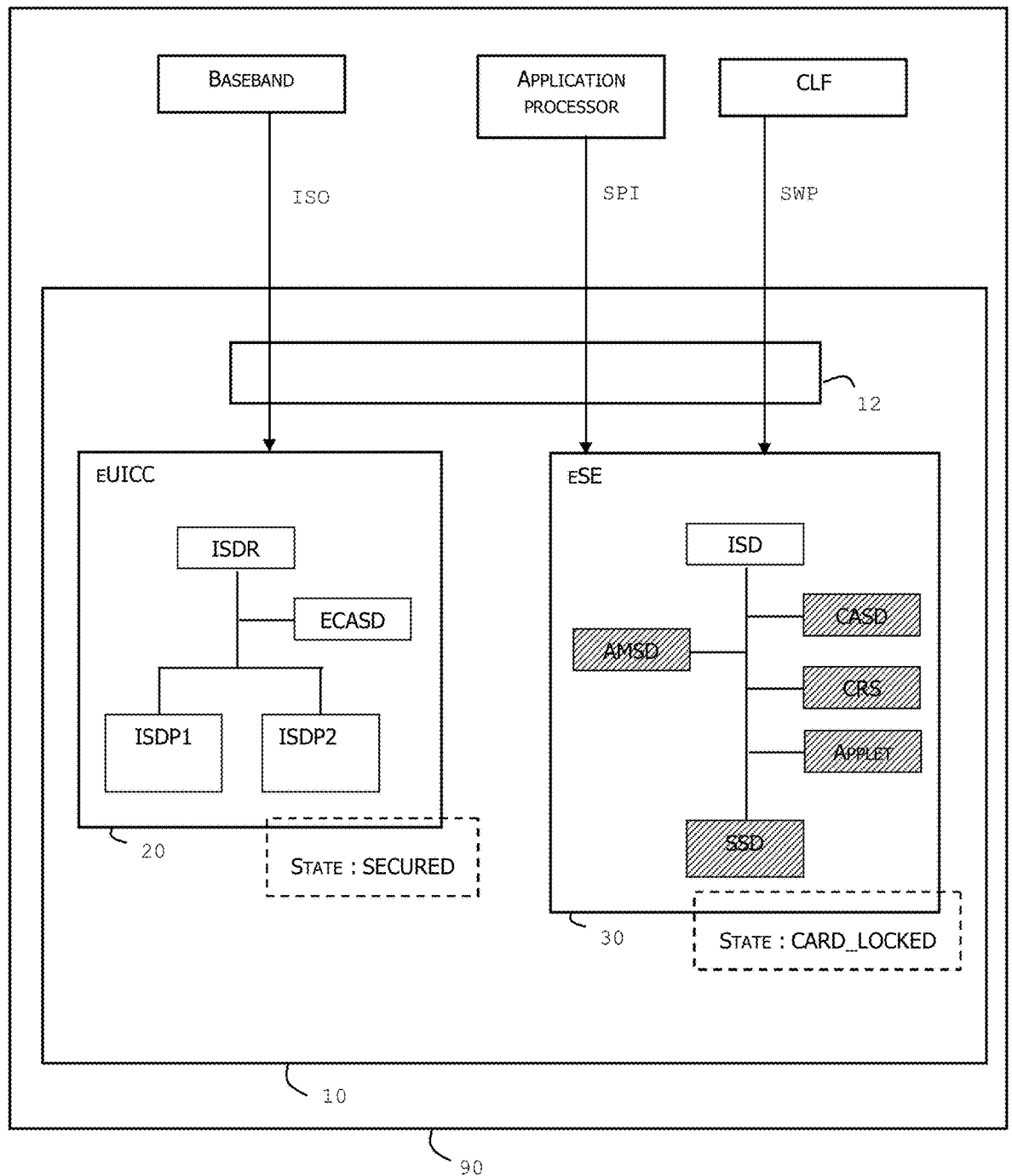
FIG. 4 depicts an example of host comprising a tamper-proof device having an eSE part set to CARD_LOCKED state according to the invention.

FIG. 4 shows an example of host machine 90 comprising a tamper-proof device 10 having an eSE part set to CARD_LOCKED state according to the invention.

The received SET STATUS command requesting a change to CARD_LOCKED state (as mentioned at FIG. 3) is assumed to have been successfully executed. The Registry 19 has been updated and specifies now that the state is CARD_LOCKED.

From this stage, incoming commands conveyed through ISO7816 protocol are processed by the supervisor agent as if the current state is set to SECURED and incoming commands conveyed through SPI or SWP protocols are processed by the supervisor agent 18 as if the current state is set to CARD_LOCKED.

Thus only the ISD (having the Final Application privilege) can be selected in the software container 30 through SPI/SWP channel. All other elements (AMSD, CASD, CRS, APPLET and SSD) which have not the Final Application privilege and which are stored in the software container 30 cannot be targeted by any commands. All security domains and applications of the the software container 20 (corresponding to the eUICC part) are still selectable thanks to the ISO7816 protocol.

Assuming now that the ISD of the software container 30 (corresponding to the eSE part) has the Card Terminate privilege. A further incoming SET STATUS command (sent by the CLF through SWP for instance) aiming at changing the state to TERMINATED is checked and authorized by the supervisor agent 18.

It must be understood, within the scope of the invention, that the above-described embodiments are provided as non-limitative examples. In particular, the features described in the presented embodiments and examples may be combined.

The tamper-proof device 10 may comprise more than two software containers.

The invention allows to control declaration and use of privileges according to the used communication protocol of incoming commands.

The architectures of the tamper-proof device shown at FIGS. 1 and 2 are provided as examples only. The tamper-proof device may have different architectures.

For example, the ruling data 14 may be stored in the tamper-proof device and outside the operating system 12 itself. In such a case the supervisor agent 18 is adapted to read the ruling data 14 when needed.

The above described communication interface is a physical interface which may work in either contact mode or in contactless mode.

Although describes in the framework of a telecom equipment, the invention also applies to tamper-proof devices whose software containers do not comprise any Telecom profiles.

The invention claimed is:

1. A method for managing a secure element comprising a processor and an operating system configured to handle a set of communication protocols with external entities,
    wherein the operating system accesses a ruling data specifying for each communication protocol of said set whether Card Lock, Card Terminate and Final Application privileges as defined by GlobalPlatform Card Specification are authorized or forbidden and wherein, upon receipt from one of said external entities of a command whose execution depends on one of said privileges, the operating system identifies which communication protocol of said set of communication protocols has been used to convey the command then uses the identified communication protocol as a discriminator to deny or to authorize said execution of said command based on the ruling data.

2. The method according to claim 1, wherein the operating system uses a transport layer of the identified communication protocol as a discriminator to deny or to authorize execution of said command based on the ruling data.

3. The method according to claim 1, wherein the secure element comprises both a first software container including a security domain compliant with GlobalPlatform Card Specification and a second software container including a Telecom profile compliant with GSMA Remote Provisioning Architecture for embedded UICC Technical Specification (SGP.02).

4. The method according to claim 1, wherein the secure element comprises a registry storing a state set to SECURED, wherein the command is a SET STATUS requesting a change toward CARD_LOCKED state, said SECURED and CARD_LOCKED states and SET STATUS being compliant with GlobalPlatform Card Specification, and wherein the operating system denies execution of the command if the communication protocol used to convey the command is compliant with a transport layer protocol as defined by ETSI ISO7816-3, and wherein the operating system authorizes execution of the command if the communication protocol used to convey the command is compliant with SPI or SWP.

5. The method according to claim 4, wherein the operating system receives, from a source internal to the secure element, a request to change toward CARD_LOCKED state and wherein the operating system denies execution of the request if the source belongs to a software container including a Telecom profile compliant with GSMA Remote Provisioning Architecture for embedded UICC Technical Specification.

6. The method according to claim 1, wherein the set of communication protocols comprises T=0 or T=1 as defined by ETSI ISO7816-3 and at least one of SWP contactless type A, SWP contactless type B, SWP contactless type F, APDU Gate or SPI.

7. The method according to claim 1, wherein the secure element is an embedded secure element, an integrated secure element, a secure enclave, a smart card or a Machine-To-Machine device.

8. A secure element comprising a hardware processor communicatively coupled to an operating system configured to handle a set of communication protocols with external entities,
    wherein the operating system comprises a ruling data specifying for each communication protocol of said set whether Card Lock, Card Terminate and Final Application privileges as defined by GlobalPlatform Card Specification are authorized or forbidden, and wherein the operating system comprises a supervisor agent configured to, upon receipt from one of said external entities of a command whose execution depends on one of said privileges, identify which communication protocol of said set of communication protocols has been used to convey the command then to use the identified communication protocol as a discriminator to deny or authorize said execution of the command based on the ruling data
    where said supervisor agent is a software component embedded in said operating system, and both said supervisor agent and said operating system comprise instructions which are executed by the hardware processor of the secure element.

9. The secure element according to claim 8, wherein the supervisor agent is configured to use a transport layer of the identified communication protocol as a discriminator to deny or to authorize execution of said command based on the ruling data.

10. The secure element according to claim 9, wherein the set of communication protocols comprises T=0 or T=1 as defined by ETSI ISO7816-3 and at least one of SWP contactless type A, SWP contactless type B, SWP contactless type F, APDU Gate or SPI.

11. The secure element according to claim 9, wherein the secure element is an embedded secure element, an integrated secure element, a secure enclave, a smart card or a Machine-To-Machine device.

12. The secure element according to claim 9, wherein the secure element is embedded in a host device.

13. The secure element according to claim 12, wherein the host device is a phone, a watch, a pair of glasses, a car, a meter, a drone or a robot.

14. The secure element according to claim 8, wherein the secure element comprises both a first software container including a security domain compliant with GlobalPlatform Card Specification and a second software container including a Telecom profile compliant with GSMA Remote Provisioning Architecture for embedded UICC Technical Specification.

15. The secure element according to claim 8, wherein the secure element comprises a registry storing a state set to SECURED, wherein the command is a SET STATUS requesting a change toward CARD_LOCKED state, said SECURED and CARD_LOCKED states and SET STATUS being compliant with GlobalPlatform Card Specification, and wherein the operating system is configured to deny execution of the command if the communication protocol used to convey the command is compliant with a transport layer protocol as defined by ETSI ISO7816-3, and wherein the operating system is configured to authorize execution of the command if the communication protocol used to convey the command is compliant with SPI or SWP.

* * * * *